(12) United States Patent
Balraj et al.

(10) Patent No.: US 9,088,315 B2
(45) Date of Patent: Jul. 21, 2015

(54) RADIO COMMUNICATIONS SYSTEM AND METHOD PERFORMED THEREIN

(75) Inventors: Rajarajan Balraj, Duesseldorf (DE);
Biljana Badic, Duesseldorf (DE);
Tobias Scholand, Muelheim (DE)

(73) Assignee: Intel Mobile Communications GmbH, Neubiberg (DE)

( * ) Notice: Subject to any disclaimer, the term of this patent is extended or adjusted under 35 U.S.C. 154(b) by 371 days.

(21) Appl. No.: 13/449,376

(22) Filed: Apr. 18, 2012

(65) Prior Publication Data

US 2013/0279425 A1  Oct. 24, 2013

(51) Int. Cl.
*H04W 4/00* (2009.01)
*H04B 7/04* (2006.01)
*H04B 7/06* (2006.01)

(52) U.S. Cl.
CPC ............ *H04B 7/0456* (2013.01); *H04B 7/0619* (2013.01)

(58) Field of Classification Search
CPC .................................................. H04B 7/0417
USPC ......................................................... 370/329
See application file for complete search history.

(56) References Cited

U.S. PATENT DOCUMENTS

| | | | |
|---|---|---|---|
| 2011/0273993 A1* | 11/2011 | Mazzarese et al. | 370/241 |
| 2012/0214500 A1* | 8/2012 | Lv et al. | 455/450 |
| 2012/0307672 A1* | 12/2012 | Liu et al. | 370/252 |
| 2013/0022139 A1* | 1/2013 | Chen et al. | 375/260 |
| 2013/0315156 A1* | 11/2013 | Xiao et al. | 370/329 |

OTHER PUBLICATIONS

3GPP 36.201 V8.3.0 (Mar. 2009), pp. 1-13.
Jianchi Zhu, et al., "Efficient CQI Update Scheme for Codebook Based MU-MIMO with Single CQI Feedback in E-UTRA", IEEE France 2008.
Helka-Liina Maattanen, et al., "CQI-Report Optimization for Multi-Mode MIMO with Unitary Code-book Based Precoding", IEEE Japan 2009.
Yongxing Zhou, et al., "Flexible Multi-User MIMO with Limited Feedback", IEEE Spain, Apr. 2009.
3GPP R1-093421 (3GPP TSG RAN 1#58), Aug. 24-28, 2009, pp. 1-5.
Zijian Bai et al., "On the Equivalence of MMSE and IRC Receiver in MU-MIMO Systems", IEEE, Sep. 2011.

* cited by examiner

*Primary Examiner* — Shaq Taha
(74) *Attorney, Agent, or Firm* — Eschweiler & Associates, LLC

(57) ABSTRACT

A method includes a step of determining a first spatial correlation matrix at a first mobile station, a step of normalizing the first spatial correlation matrix, a step of transmitting the normalized first spatial correlation matrix from the first mobile station to a base station and a step of determining a first channel quality indicator at the base station wherein the first channel quality indicator is based on the normalized first spatial correlation matrix.

21 Claims, 4 Drawing Sheets

RADIO COMMUNICATIONS SYSTEM AND METHOD PERFORMED THEREIN

FIELD

The invention relates to mobile communications. More particular, the invention relates to radio communications systems and methods performed therein.

BACKGROUND

A communication between components of a cellular radio network may be based on link adaptation and User Equipment (UE) pairing. Radio communications systems and methods performed therein constantly have to be improved. In particular, it may be desirable to improve the quality and the performance of a communication between components of the system.

BRIEF DESCRIPTION OF THE DRAWINGS

Aspects of the disclosure are made more evident by way of example in the following detailed description of embodiments when read in conjunction with the attached drawing figures, wherein.

DETAILED DESCRIPTION

Figure 1:
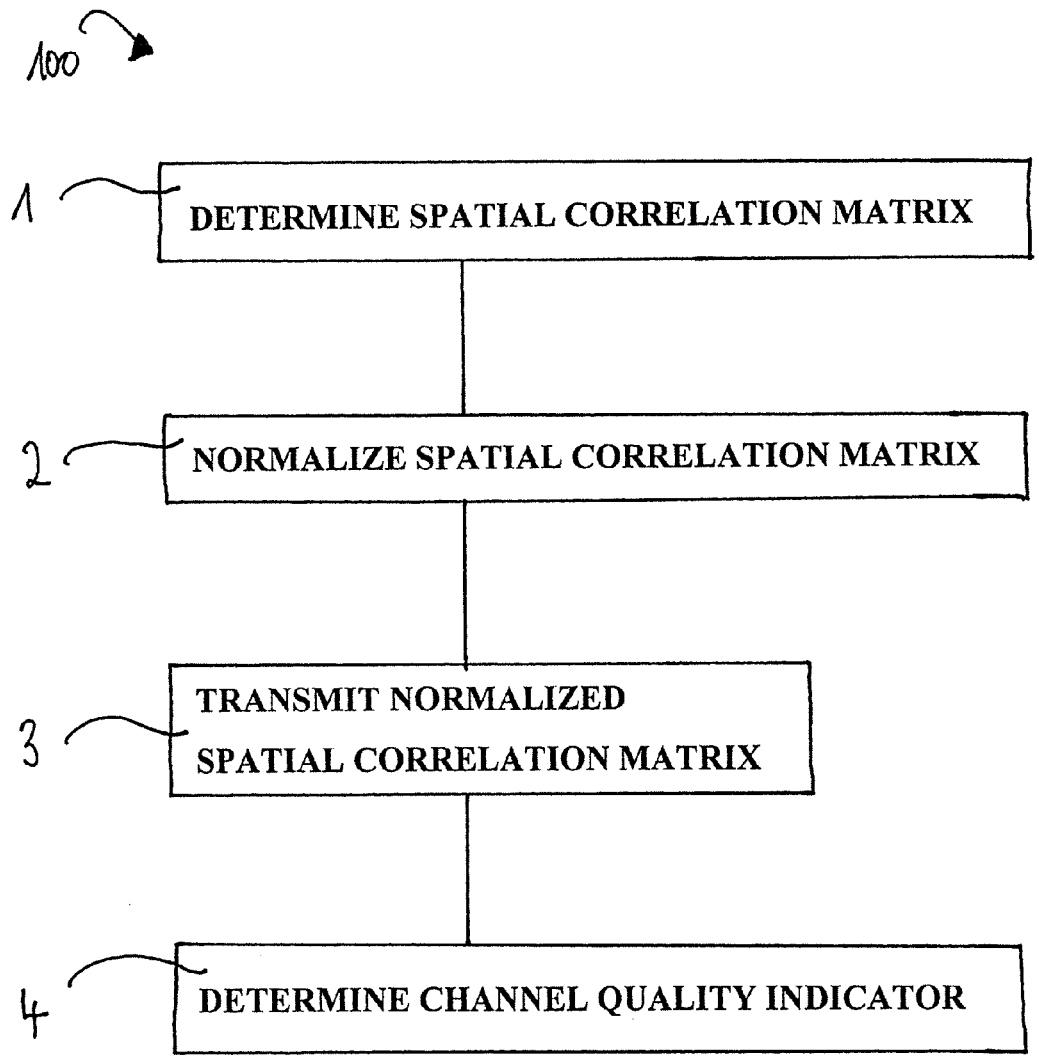
FIG. 1 is a schematic block diagram of a method 100 in accordance with the disclosure.

In the following detailed description, reference is made to the accompanying drawings, which form a part thereof, and in which are shown by way of illustration embodiments in which the invention may be practiced. It is understood that further embodiments may be utilized and structural or logical changes may be made without departing from the scope of the present disclosure. It is further understood that the features of the various exemplary embodiments described herein may be combined with each other, unless specifically noted otherwise. The following detailed description is thus not to be taken in a limiting sense, and the scope of the present invention is defined by the appended claims.

As employed in this specification, to the extent that the terms "include", "have", "with" or other variants thereof are used in either the detailed description or the claims, such terms are intended to be inclusive in a manner similar to the term "comprise". The term "exemplary" is merely meant as an example, rather than the best or optimal.

The methods described herein may be performed in various wireless communication networks such as Code Division Multiple Access (CDMA), Time Division Multiple Access (TDMA), Frequency Division Multiple Access (FDMA), Orthogonal FDMA (OFDMA) and Single Carrier FDMA (SC-FDMA) networks. In this connection, the terms "network", "system" and "radio communications system" may be used synonymously. In radio communications systems, a transmitter transmitting one or more radio communications signals over one or more radio communications channels may be present. The transmitter may be a base station or a transmitting device included in a user's device, such as a mobile radio transceiver, a handheld radio device or any similar device. Radio communications signals transmitted by transmitters may be received by receivers such as a receiving device in a mobile radio transceiver or mobile station. By way of example, a mobile station may be represented by a cellular phone, a smartphone, a tablet PC, a laptop, etc. Note that a base station may also be referred to as "Node B" or "eNode B" and a mobile station may also be referred to as "User Equipment" (UE). In the following, the respective terms shall have the same meaning, which meaning shall include the definitions given in the various standards (e.g. UMTS, LTE and derivatives thereof).

The methods and systems described herein may be operated according to a Multiple Input Multiple Output (MIMO) technique providing the use of multiple antennas at both, the transmitter and the receiver. It is understood that the described methods and systems may also be operated for the case of only one antenna at the receiver. MIMO is a part of wireless communications standards such as IEEE 802.11n (Wi-Fi), 4G, 3GPP Long Term Evolution, WiMAX and HSPA+. In this context, the term "spatial-multiplexing" may be used which corresponds to a transmission technique in MIMO wireless communication and which may be used to transmit independent and separately encoded data signals, so-called streams, from each of the multiple transmit antennas of a base station. Similarly, a mobile station may receive multiple transmitted streams by means of a plurality of receive antennas. An encoding of data in spatial-multiplexing may be based on an open-loop approach or a closed-loop approach.

Multi-User (MU) MIMO schemes allow multiple mobile stations to share the same resource in frequency and time domains, i.e. same resource blocks, and multiplex their signals on the spatial domain. MU-MIMO may be regarded as an extended version of the Space-Division Multiple Access (SDMA) scheme. In 3G/HSPA MU-MIMO, the mobile stations may also share the same time and channelization code (e.g. Orthogonal Variable Spreading Factor (OVSF)/Spreading Code). For MU-MIMO, a base station may schedule multiple mobile stations for a data transmission. Transmission data is then transmitted from the base station to the scheduled mobile stations simultaneously. During a data transmission, interferences between data streams transmitted from the base station to the co-scheduled mobile stations may occur. Note that the terms "mobile station of interest" and "co-scheduled mobile station/interfering mobile station" used in the following do not refer to an identical mobile station, but correspond to two different mobile stations of two different users.

The methods and systems described herein may utilize a spatial correlation matrix configured to determine and/or configured to mathematically describe a correlation of e.g. channels between a mobile station and different transmit antennas of a base station wherein the correlation may be observed at the mobile station. A spatial correlation matrix may be computed at the mobile station on the basis of signals received from the base station, for example pilot signals. In particular, a spatial correlation matrix may be based on and/or may be formed of channel matrices associated with the channels between the respective transmit antenna of the base station and the mobile station.

The methods and systems described herein may utilize link adaptation. In link adaptation, modulation and coding parameters as well as further signal and protocol parameters may be dynamically adapted to conditions of an associated radio channel or link which may depend on path loss, interference effects, etc. Such parameters may be adapted periodically, for example for every frame or every sub-frame, in particular every 2 milliseconds.

The methods and systems described herein may utilize a channel state information (CSI). In wireless communications, CSI may refer to channel properties of a communication link. Such information may specify how a signal propagates from a transmitter to a receiver and thereby may represent the combined effect of, for example, scattering, fading and power decay with distance. CSI may support link adaptation in order to achieve reliable communications with high data rates in (MU)-MIMO systems. CSI may be estimated at the receiver and may be fed back to the transmitter in a quantized form. Note that fed back CSI may be further processed by the receiver. That is, a transmitter and a receiver may provide different CSI wherein CSI at the transmitter and CSI at the receiver may be referred to as CSIT and CSIR, respectively.

For example, CSI may include or may be used to determine a channel quality indicator (CQI). A CQI may be based on a measurement of a communication quality of one or more wireless channels. Hence, a CQI may be a value (or values) representing a measure of a channel quality for a given channel. Similar to CSI, the term CQI may refer to channel information provided by the transmitter or the receiver. In particular, the term CQI may refer to information determined at a mobile station as well as to information determined at a mobile station and fed back to a base station and processed by the base station. For example, a high value CQI may be indicative of a channel with high quality and vice versa. A CQI may be computed by utilizing values of a Signal-to-Noise Ratio (SNR), Signal-to-Interference plus Noise Ratio (SINR), Signal-to-Noise plus Distortion Ratio (SNDR), a Signal to Leakage plus Noise Ratio (SNLR), etc. of a channel. Of course, a CQI may depend on an employed modulation scheme. For example, a communications system based on CDMA may utilize a different CQI compared to a communications system utilizing OFDM. In MIMO and space-time coded systems, a CQI may also depend on the receiver type.

The methods and systems described herein may utilize precoding weights, precoding vectors, precoding matrices, etc. In SU-MIMO systems, a precoding scheme may be based on weighting multiple data streams emitted from the transmit antennas of a base station with weights that may be chosen to maximize a signal power at the receiver output and thus the link throughput. In MU-MIMO systems, precoding weights may e.g. be chosen to maximize a sum capacity. MU-MIMO may be supported by codebook feedback based precoding or a dual-codebook approach. In practice, a precoding codebook including multiple predetermined precoding weights (or precoding vectors or precoding matrices) may be stored in a base station such that appropriate weights may be chosen from the codebook on the basis of channel information, for example CSI and/or a CQI. Alternatively, precoding weights may be determined by the base station at predetermined times and/or periodically.

The methods and systems described herein may utilize UE scheduling or UE pairing. In MU-MIMO, a sum throughput, i.e. a sum of data rates of all mobile stations, may be increased by scheduling multiple mobile stations on the same time and frequency resources. In particular, scheduling two mobile station on a same time and frequency resource may be referred to as UE pairing. It is understood that more than two mobile stations may be scheduled on the same time and frequency resource.

The methods and systems described herein may utilize an Uplink/Downlink reciprocity. In a Time Division Multiplex (TDD) system, CSI for a closed-loop transmission may be obtained by leveraging multipath channel reciprocity. That is, a mobile station may transmit a specialized sounding waveform that may allow the base station to determine the uplink channel. The downlink channel between the base station transmit antennas and the mobile station receive antennas may be then be estimated under an assumption of reciprocity.

In the following, various methods performed in radio communications systems are described. It is understood that comments made in connection with a described method may also hold true for a corresponding radio communications system configured to perform the method. For example, if a specific method step performed by a mobile station or a base station is described, it is understood that a corresponding mobile station or base station of the radio communications system may include a unit to perform the described method step, even if such a unit is not explicitly described herein.

Methods 100, 200, 300 and 400 in accordance with the disclosure are described. It is understood that each of these methods may be modified by adding further method steps. In particular, a method may be extended by one or more method steps described in connection with a respective other method. Further, additional method steps may be derived by all further parts of this description, unless specifically noted otherwise.

FIG. 1 illustrates a schematic block diagram of a method 100 in accordance with the disclosure. In a method step 1, a spatial correlation matrix is determined at a mobile station. In a method step 2, the spatial correlation matrix is normalized. In a method step 3, the normalized spatial correlation matrix is transmitted from the mobile station to a base station. In a method step 4, a channel quality indicator is determined at the base station wherein the channel quality indicator is based on the normalized spatial correlation matrix.

Figure 2:
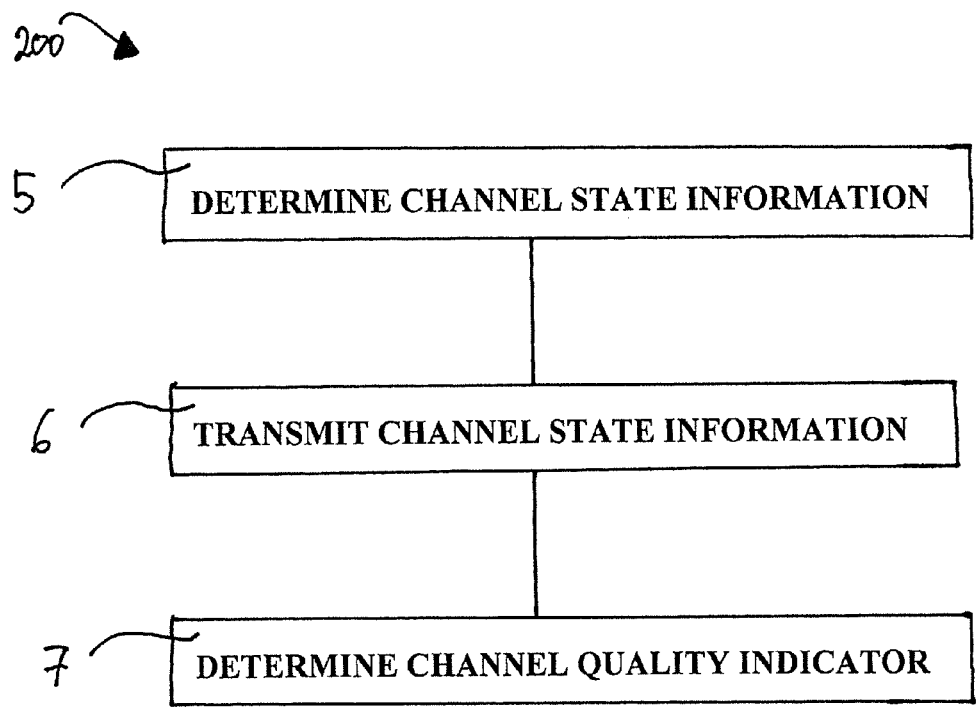
FIG. 2 is a schematic block diagram of a method 200 in accordance with the disclosure.

FIG. 2 illustrates a schematic block diagram of a method 200 in accordance with the disclosure. In a method step 5, a channel state information is determined at a mobile station wherein the channel state information is based on a trace of a spatial correlation matrix determined by the mobile station and based on a noise power determined by the mobile station. In a method step 6, the channel state information is transmitted from the mobile station to a base station. In a method step 7, a channel quality indicator is determined based on the channel state information at the base station.

Figure 3:
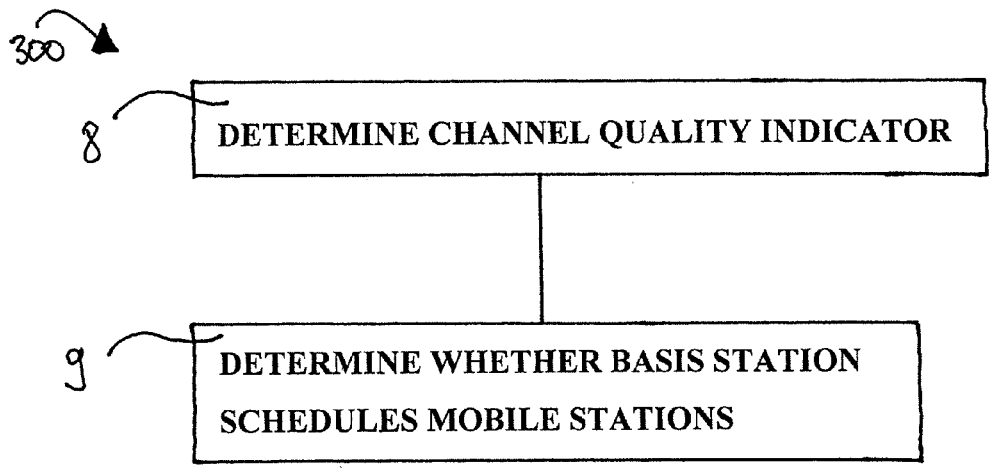
FIG. 3 is a schematic block diagram of a method 300 in accordance with the disclosure.

FIG. 3 is a schematic block diagram of a method 300 in accordance with the disclosure. In a method step 8, a channel quality indicator is determined for a communications system including a base station and at least two mobile stations wherein determining the channel quality indicator is independent of an interference between a first data stream transmitted between the first mobile station and the base station and a second data stream transmitted between the second mobile station and the base station. In a method step 9, it is determined whether the base station schedules the first mobile station and the second mobile station for a simultaneous data transmission between the base station and the mobile stations.

Figure 4:
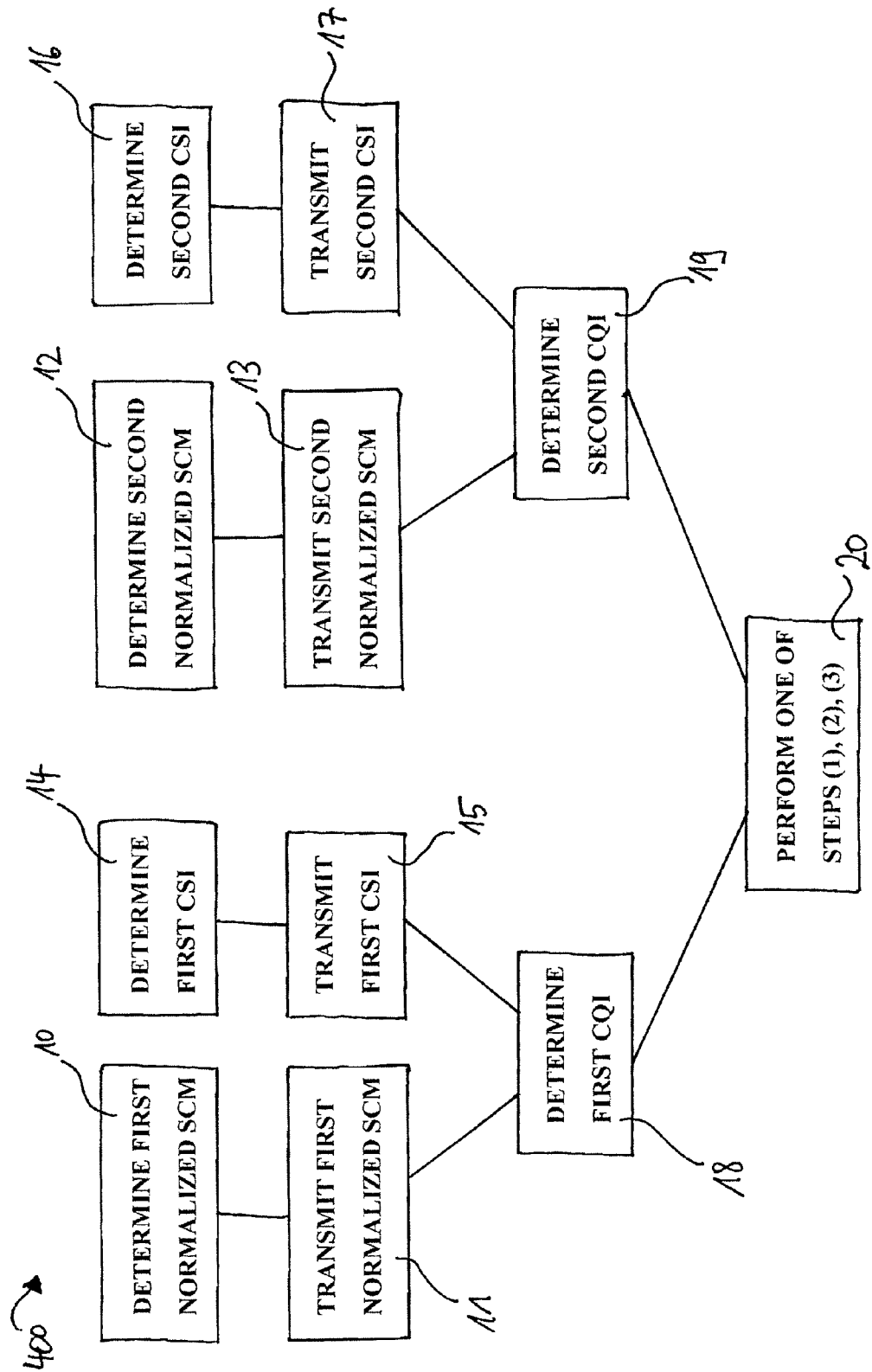
FIG. 4 is a schematic block diagram of a method 400 in accordance with the disclosure.

FIG. 4 is a schematic block diagram of a method 400 in accordance with the disclosure. In a method step 10, a first normalized spatial correlation matrix (see "SCM") is determined at a first mobile station. In a method step 11, the normalized first spatial correlation matrix is transmitted from the first mobile station to a base station. In a method step 12, a second normalized spatial correlation matrix is determined at a second mobile station. In a method step 13, the normalized second spatial correlation matrix is transmitted from the second mobile station to the base station. In a method step 14, a first channel state information is determined at the first mobile station wherein the first channel state information is based on a trace of the first spatial correlation matrix and on a noise power determined by the first mobile station. In a method step 15, the first channel state information is transmitted from the first mobile station to the base station. In a method step 16, a second channel state information is determined at the second mobile station wherein the second channel state information is based on a trace of the second spatial correlation matrix and on a noise power determined by the second mobile station. In a method step 17, the second channel state information is transmitted from the second mobile station to the base station.

In a method step 18, a first channel quality indicator is determined at the base station wherein the first channel quality indicator is based on the normalized first spatial correlation matrix and based on the first channel state information. In a method step 19, a second channel quality indicator is determined at the base station wherein the second channel quality indicator is based on the normalized second spatial correlation matrix and based on the second channel state information. In a method step 20, at least one of the following steps is performed: (1) performing a link adaptation of a transmission channel between the first mobile station and the base station on the basis of the first channel quality indicator, (2) performing a link adaptation of a transmission channel between the second mobile station and the base station on the basis of the second channel quality indicator, and (3) determining on the basis of the first channel quality indicator and on the basis of the second channel quality indicator whether the base station schedules the first mobile station and the second mobile station for a simultaneous data transmission of first data between the first mobile station and the base station and second data between the second mobile station and the base station.

It is understood that the schematic illustration of FIG. 4 does not necessarily imply a specific chronological sequence of the illustrated method steps 10 to 20. For example, method steps 10 and 12 as well as method steps 14 and 16 may be performed at the same time or may be delayed with respect to each other, respectively. The same holds true for method steps 11 and 13 as well as method steps 15 and 17, respectively. As a further example, method steps 18 and 19 may be performed at the same time while, alternatively, method step 19 may e.g. also be performed while even none of the method steps 10 and 12 has even started.

Reference is now made to a MU-MIMO system in which a base station communicates with a number of K mobile stations simultaneously on the same time-frequency resource. The base station may include an arbitrary number of $N_{tx} > 1$ transmission antennas and each of the K UEs may include one or multiple receive antennas. Precoded data x transmitted by the base station at an arbitrary time instant may be expressed as $$x = \frac{1}{\sqrt{K}} \sum_{i=1}^{K} w_i s_i. \tag{1}$$

Here, $w_i$ denotes a precoding vector of dimension $N_{tx} \times 1$ for the i-th mobile station which may be chosen from a precoding codebook having an arbitrary number of entries. In addition, $s_i$ denotes a (normalized) data symbol of a modulation alphabet employed by the base station for encoding the transmitted data for the i-th user. Precoded data x thus may correspond to a vector of dimension $N_{tx} \times 1$ containing signals sent by the $N_{tx}$ transmission antennas of the base station. The vector x may be normalized, i.e.

$$E[x^\cap x] = 1 \tag{2}$$

wherein E denotes an expectation operator.

A signal $y_1$ received by a mobile station of interest may be expressed as a vector $$y_1 = H_1 x + v \tag{3}$$

of dimension $N_{rx} \times 1$ wherein $N_{rx}$ denotes the number of receive antennas at the mobile station of interest. $H_1$ denotes a channel matrix of dimension $N_{rx} \times N_{tx}$ which is assumed to be known or estimated at the mobile station of interest. In addition, v denotes noise, for example Additive White Gaussian Noise (AWGN) having a variance of $\sigma_n^2$. Combining equations (1) and (3), the received signal $y_1$ may be written as $$y_1 = \frac{1}{\sqrt{K}} H_1 \sum_{i=1}^{K} w_i s_i + v \tag{4}$$

or $$y_1 = \frac{1}{\sqrt{K}} H_1 w_1 s_1 + \frac{1}{\sqrt{K}} H_1 \sum_{i=2}^{K} w_i s_i + v. \tag{5}$$

Various schemes may be used to determine a transmitted signal s from a received signal $y_1$. For example, an MU-MIMO equalizer may correspond to an interference unaware equalizer, e.g. including a Maximum Ratio Combiner. An MRC scheme may be expressed by $$\hat{s}_{MRC} = \frac{h_{eff}^H y_1}{\|h_{eff}\|^2} \tag{6}$$

wherein $\hat{s}_{MRC}$ corresponds to a determined symbol and $$h_{eff} = \frac{1}{\sqrt{K}} H_1 w_1 \tag{7}$$

represents an effective channel matrix having a dimension of $N_{rx} \times 1$. Combining equations (5) and (6) results in $$\hat{s}_{MRC} = \frac{h_{eff}^H s_1}{\|h_{eff}\|^2} + \frac{h_{eff}^H H_1 \sum_{i=2}^{K} w_i s_i}{\|h_{eff}\|^2} + v^*. \tag{8}$$

In order to compute Log Likelihood Ratios (LLR) corresponding to the symbol $\hat{s}_{MRC}$, a mobile station of interest may completely neglect the interference term and assume the SINR to be $$SINR = \frac{\|h_{eff}\|^2}{\sigma_n^2}. \tag{9}$$

Since utilizing an MRC scheme may not combat a co-scheduled mobile station interference, its performance may deteriorate significantly when the interference power is not negligible compared to that of additive noise, i.e. at high and medium SNRs.

A further scheme to determine a transmitted signal s may be performed by an interference aware equalizer which may correspond to or may include an Interference Rejection Combiner (IRC). An IRC scheme may be expressed by $$\hat{s}_{IRC} = \text{SINR}_{IRC}\hat{s}_{IRC-Norm} \quad (10)$$

wherein $\hat{s}_{IRC-Norm}$ and $\text{SINR}_{IRC}$ may be defined by $$\hat{s}_{IRC-Norm} = \frac{h_{\mathit{eff}}^H R_{xx}^{-1} y_1}{h_{\mathit{eff}}^H R_{xx}^{-1} h_{\mathit{eff}}} \quad (11)$$

and $$\text{SINR}_{IRC} = h_{\mathit{eff}}^H R_{xx}^{-1} h_{\mathit{eff}}, \quad (12)$$

respectively. $R_{xx}$ denotes an interference plus noise covariance matrix which may be written as $$R_{xx} = \sum_{i=2}^{K} \left(\frac{H_1 w_i}{\sqrt{K}}\right)\left(\frac{H_1 w_i}{\sqrt{K}}\right)^H + \sigma_n^2 I \quad (13)$$

wherein I denotes an identity matrix. A pre-requisite for performing an IRC scheme may be that the precoding vectors of the interfering mobile station are known to the mobile station of interest.

In the following, a scheme including CSI feedback for enabling a CQI prediction at a base station is described. It is noted that methods described herein may include any of the operational steps described in this connection. For the sake of simplicity, a MU-MIMO system including a base station and two mobile stations is considered. It is understood that the described scheme may be also applied to a multi-antenna system including more than two mobile stations. Further, the described scheme may also be applied to a SU-MIMO system having one mobile station.

During an operation, each mobile station may estimate a downlink channel, e.g. on the basis of pilot symbols, thereby determining a channel matrix. The channel matrix determined by the i-th mobile station for a k-th subcarrier may be denoted as $H_{i,k}$. Accounting for a set of subcarriers corresponding to a sub-band, a spatial correlation matrix $R_i$ may be determined at each mobile station according to $$R_i = \frac{1}{|S|} \sum_{k \in S} H_{i,k}^H H_{i,k}. \quad (14)$$

$|S|$ denotes the number of considered subcarriers and the superscript H denotes hermitian conjugation. R is a hermitian matrix of dimension $N_{rx} \times N_{rx}$ and may represent an average channel quality. It may be utilized in a MU mode, but also in an SU mode.

Each mobile station may normalize its spatial correlation matrix R, for example, by diving its entries by its trace $$G = \frac{1}{\text{trace}(R)} R. \quad (15)$$

Due to the normalization, the spatial correlation matrix may be independent of noise powers.

Each mobile station may transmit its normalized spatial correlation matrix G to the base station. For this purpose, each mobile station may quantize the entries of its respective spatial correlation matrix on the basis of a modulation alphabet, for example 16-Quadrature Amplitude Modulation (QAM), 64-QAM or any other Phase Shift Keying (PSK) modulation alphabet. Note that a quantization may have particularly become possible due to the normalization of equation (15). For the case of a radio communications system based on TDD, feeding back (normalized) spatial correlation matrices to the base station may be omitted. Alternatively, a normalized spatial correlation matrix may be estimated at the base station on the basis of an Uplink/Downlink reciprocity.

Each mobile station may determine a CSI (or CQI) according to $$CQI_{SCF} = \frac{\text{trace}(R)}{\sigma_n^2} \quad (16)$$

wherein $\sigma_n^2$ denotes a noise power which may be estimated by the respective mobile station. In equation (16), the subscript "SCF" stands for Spatial Correlation Feedback. Each of the determined CQI values, e.g. represented in dB values, may be quantized and transmitted by the respective mobile station to the base station. For this purpose, the CQI value may be transformed by the respective mobile station to a linear scale. For example, an exemplary range from −10 dB to 30 dB may be scaled to an exemplary range of values from 0 to 15 that may be represented by 4 bits. The transformed value may be denoted as $\text{SINR}_{SU,i}$ indicating that the CQI may be based on a SINR only taking into account the respective mobile station. From equations (15) and (16) it can be seen that all noise powers and interferences of the considered channels may be absorbed in the CQI value while the normalized spatial correlation matrix may be independent thereof.

The base station may determine precoding weights in the form of precoding matrices (or precoding vectors) $P_i$ and $P_j$ for each of the mobile stations. For this purpose, a criterion of maximizing a Signal to Leakage plus Noise Ratio (SNLR) may be applied by $$\max_{P_i} (SLNR) = \frac{\text{trace}(P_i^H R_i P_i)}{\frac{\text{trace}(P_i^H R_j P_i)}{N_{rx}} + N_i} \quad (17)$$

and $$\max_{P_j} (SLNR) = \frac{\text{trace}(P_j^H R_j P_j)}{\frac{\text{trace}(P_j^H R_i P_j)}{N_{rx}} + N_j}. \quad (18)$$

$N_i$ and $N_j$ denote an interference plus noise power at the i-th and j-th mobile station, respectively. In equations (17) and (18), the numerator may represent a signal power associated with the respective channel while the first addend of the denominator may represent an interference resulting from a respective other mobile station. Note that, for the case of three mobile stations, the trace in the first addend of the denominator may be extended by an additional addend representing an interference resulting from the third mobile station.

The precoding vectors $P_i$ and $P_j$ correspond to the closed-form solutions $$P_i = \max \text{eig}\{(R_i + N_i I)^{-1} R_j\} \quad (19)$$

and $$P_j = \max \text{eig}\{(R_j + N_j I)^{-1} R_i\} \quad (20)$$

where I denotes a unity matrix. The input of the operator "maxeig" is a matrix of dimension $N_{rx} \times N_{rx}$ and the operator "maxeig" corresponds to obtaining the Eigenvectors having the largest $N_{rx}$ Eigenvalues of the input matrix. Note that the number of precoding vectors corresponds to the number of considered mobile stations. The precoding vectors may e.g. be computed by using a Matrix-Pencil method.

An effective correlation matrix T may be determined at the base station according to $$T = [P_i P_j]^H G [P_i P_j]. \quad (21)$$

CQI values may be determined at the base station. The CQI values may be utilized for a MU-MIMO transmission and thus may also be referred to as MU-MIMO CQI or MU-SINR/CQI. On the basis of such CQI values, a communication between the base station and the first mobile station and/or the second mobile station may be adjusted. For example, a link adaptation of a transmission channel between the first mobile station and the base station may be adjusted. In another example, a link adaptation of a transmission channel between the second mobile station and the base station may be adjusted.

The MU-MIMO CQI may depend on a receiver type included in the considered mobile station(s). For the case of an interference unaware equalizer, e.g. MRC, the MU-MIMO CQI may be determined by $$SINR_{MU,MRC,i} = 10 \log 10 \left( \frac{P_i^H G_i P_i}{\frac{\text{trace}(P_j^H G_i P_j)}{N_{rx}} + \frac{1}{SINR_{SU,i}}} \right). \quad (22)$$

It is noted that the MU-MIMO CQI of equation (22) may be determined without interference suppression operations, i.e. it does not depend on an interference between data streams transmitted between the first mobile station and the base station and data streams transmitted between a second mobile station and the base station.

For the case of an interference aware equalizer, e.g. IRC, a matrix B may be determined by $$B_i = \left( T^H T + \frac{1}{SINR_{SU,i}} I \right)^{-1}. \quad (23)$$

A MU-MIMO CQI may be determined for each of the mobile stations according to $$SINR_{MU,IRC,i} = 10 \log 10 \left( \frac{SINR_{SU}}{B_{i,i}} \right) \quad (24)$$

wherein $B_{i,i}$ denotes diagonal elements of the matrix $B_i$ associated with the i-th mobile station.

A maximum sum capacity may be determined according to $$C_{i,j} = \log 2(1 + SINR_{MU,i}) + \log 2(1 + SINR_{MU,j}). \quad (25)$$

Note that the number of addends in equation (25) particularly corresponds to the number of considered mobile stations. Based on the value of the sum capacity, a communication between the base station and the first mobile station and/or the second mobile station may be adjusted. For example, a link adaptation of a transmission channel between the first mobile station and the base station may be adjusted. In another example, a link adaptation of a transmission channel between the second mobile station and the base station may be adjusted. In yet another example, it may be determined whether the base station schedules the first mobile station and the second mobile station for a simultaneous data transmission of first data between the first mobile station and the base station and second data between the second mobile station and the base station. In particular, the two mobile stations having the MU-MIMO CQI values resulting in a maximum value of the sum capacity of equation (25) may be "UE paired". Such adjustments, and thus determining the MU-MIMO CQIs and/or the sum capacity, may be performed periodically, for example for each frame or for each subframe. Alternatively, the adjustments may be performed non-periodically, for example by the base station triggered at predetermined times.

Figure 5:
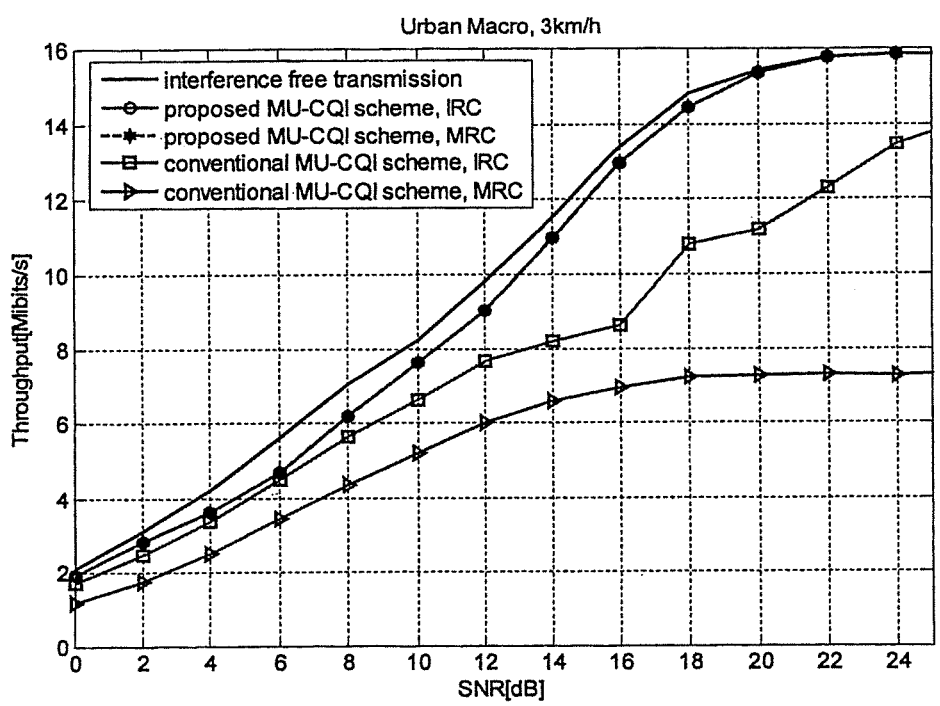
FIG. 5 illustrates performances of radio communication systems.

FIG. 5 illustrates performances of radio communication systems wherein throughput performances in Mibit/s are plotted against an SNR per receive antenna in dB. Five graphs are illustrated wherein a first graph (see "interference free transmission") refers to an interference free radio communications system. A second graph (see "proposed MU-CQI scheme, IRC") refers to a radio communications system based on one of the methods 100 to 400 and based on a calculation of a MU-MIMO CQI according to equation (24). A third graph (see "proposed MU-CQI scheme, MRC") refers to a radio communications system based on one of the methods 100 to 400 and based on a calculation of a MU-MIMO CQI according to equation (22). A fourth and fifth graph (see "conventional MU-CQI scheme, IRC" and "conventional MU-CQI scheme, MRC") refer to schemes known from LTE and LTE-A employing an IRC and MRC, respectively. In these cases, a post-processing SINR of IRC and MRC receivers has been calculated at the base station based on a SU-MIMO CSI feedback (SU MIMO PMI/RI/CQI).

In FIG. 5, a low mobility scenario is considered where a speed of the mobile stations is about 3 km/h. A Spatial Channel Model Extended (SCME) and a high correlated antenna configuration (see "Urban Macro") have been applied. In addition, ideal channel estimation, HARQ, Adaptive Modulation and Coding (AMC) and no feedback delay have been assumed.

From FIG. 5 it becomes apparent that the methods 100 to 400 outperform the MU-MIMO CQI prediction based on the other feedback schemes. The performances of the methods 100 to 400 is close to an interference free transmission for both type of receivers, MRC and IRC. A reason may be that more accurate CSI (combination of SCF and TxD CQI feedback) may be provided according to methods 100 to 400 compared to the other PMI/CQI feedback schemes. Consequently, more suitable precoding vectors and MU-MIMO CQI may be calculated and predicted for MU-MIMO transmission. With the proposed scheme, the implementation of advanced interference-aware receiver may be omitted which may result in a reduced complexity of and reduced costs for mobile stations.

While the invention has been illustrated and described with respect to one or more implementations, alterations and/or modifications may be made to the illustrated examples without departing from the spirit and scope of the appended claims. Also, techniques, systems, subsystems and methods described and illustrated in the various embodiments may be combined with other techniques, systems, subsystems and methods without departing from the scope of the present disclosure. Other examples of changes, substitutions and alterations are ascertainable by one skilled in the art and could be made without departing from the spirit and scope disclosed herein.

What is claimed is:

1. A method, comprising:
   determining a first spatial correlation matrix at a first mobile station;
   normalizing the first spatial correlation matrix, wherein normalizing the first spatial correlation matrix comprises dividing the entries of the first spatial correlation matrix by a trace of the first spatial correlation matrix;
   determining a channel state information depending on the first spatial correlation matrix and on a noise power; and
   transmitting the normalized first spatial correlation matrix and the channel state information from the first mobile station to a base station.

2. The method of claim 1, further comprising determining a first channel quality indicator at the base station wherein the first channel quality indicator is based on the normalized first spatial correlation matrix.

3. A method, comprising:
   determining a first spatial correlation matrix at a first mobile station;
   normalizing the first spatial correlation matrix;
   determining a channel state information depending on the first spatial correlation matrix and on a noise power;
   transmitting the normalized first spatial correlation matrix and the channel state information from the first mobile station to a base station; and
   quantizing the entries of the first normalized first spatial correlation matrix on the basis of a modulation alphabet.

4. The method of claim 1, wherein the first spatial correlation matrix depends on a channel matrix of a transmission channel between the first mobile station and the base station.

5. The method of claim 1, further comprising:
   determining at least one precoding vector on the basis of the normalized first spatial correlation matrix.

6. The method of claim 5, further comprising:
   determining an effective correlation matrix on the basis of the at least one precoding vector and the normalized first spatial correlation matrix.

7. The method of claim 2, further comprising:
   performing a link adaptation of a transmission channel between the first mobile station and the base station on the basis of the first channel quality indicator.

8. The method of claim 2, further comprising:
   determining a channel state information at the first mobile station wherein the channel state information depends on a trace of the first spatial correlation matrix and on a noise power determined by the first mobile station; and
   transmitting the channel state information from the first mobile station to the base station wherein determining the first channel quality indicator further depends on the channel state information.

9. The method of claim 8, wherein the channel state information comprises a ratio between the trace of the first spatial correlation matrix and a square of the noise power determined by the first mobile station.

10. The method of claim 2, wherein the first channel quality indicator is independent of an interference between a first data stream transmitted between the first mobile station and the base station and a second data stream transmitted between a second mobile station and the base station.

11. The method of claim 1, wherein the first mobile station comprises an interference unaware receiver.

12. The method of claim 2, further comprising:
    determining a second spatial correlation matrix at a second mobile station;
    normalizing the second spatial correlation matrix; and
    transmitting the second normalized spatial correlation matrix from the second mobile station to the base station; and
    determining a second channel quality indicator at the base station wherein the second channel quality indicator is based on the second normalized spatial correlation matrix.

13. The method of claim 12, further comprising:
    determining on the basis of the first channel quality indicator and on the basis of the second channel quality indicator whether the base station schedules the first mobile station and the second mobile station for a simultaneous data transmission of first data between the first mobile station and the base station and second data between the second mobile station and the base station.

14. The method of claim 13, further comprising:
    determining a sum capacity on the basis of the first channel quality indicator and on the basis of the second channel quality indicator wherein determining whether the base station schedules the first mobile station and the second mobile station is based on the sum capacity.

15. The method of claim 14, wherein the sum capacity is independent of an interference between the first data and the second data.

16. The method of claim 13, wherein the first data and the second data are transmitted simultaneously on a same time-frequency resource.

17. The method of claim 13, wherein the first data and the second data are transmitted simultaneously on a same time and channelization/spreading code.

18. The method of claim 2, wherein determining the first channel quality indicator is performed periodically.

19. A method, comprising:
    determining a channel state information at a mobile station, wherein the channel state information is based on a trace of a spatial correlation matrix determined by the mobile station and based on a noise power determined by the mobile station;
    determining a channel quality indicator based on the channel state information at the base station;
    determining a normalized spatial correlation matrix at the mobile station, wherein determining the channel quality indicator is further based on the normalized spatial correlation matrix, wherein determining a normalized spatial correlation matrix comprises dividing the entries of the spatial correlation matrix by a trace of the spatial correlation matrix; and
    transmitting the channel state information from the mobile station to a base station.

20. The method of claim 19, further comprising:
    determining a normalized spatial correlation matrix at the base station on the basis of an Uplink/Downlink reciprocity wherein determining the channel quality indicator is further based on the normalized spatial correlation matrix.

21. A method, comprising:
    determining a first normalized spatial correlation matrix at a first mobile station;
    transmitting the normalized first spatial correlation matrix from the first mobile station to a base station;
    determining a second normalized spatial correlation matrix at a second mobile station;
    transmitting the normalized second spatial correlation matrix from the second mobile station to the base station;
    determining a first channel state information at the first mobile station, wherein the first channel state information is based on a trace of the first spatial correlation matrix and on a noise power determined by the first mobile station;

transmitting the first channel state information from the first mobile station to the base station;

determining a second channel state information at the second mobile station, wherein the second channel state information is based on a trace of the second spatial correlation matrix and on a noise power determined by the second mobile station;

transmitting the second channel state information from the second mobile station to the base station;

determining a first channel quality indicator at the base station wherein the first channel quality indicator is based on the normalized first spatial correlation matrix and based on the first channel state information;

determining a second channel quality indicator at the base station wherein the second channel quality indicator is based on the normalized second spatial correlation matrix and based on the second channel state information; and performing at least one of the following steps: (1) performing a link adaptation of a transmission channel between the first mobile station and the base station on the basis of the first channel quality indicator, (2) performing a link adaptation of a transmission channel between the second mobile station and the base station on the basis of the second channel quality indicator and (3) determining on the basis of the first channel quality indicator and on the basis of the second channel quality indicator whether the base station schedules the first mobile station and the second mobile station for a simultaneous data transmission of first data between the first mobile station and the base station and second data between the second mobile station and the base station.

* * * * *